United States Patent
Yamada et al.

(10) Patent No.: US 9,333,636 B2
(45) Date of Patent: May 10, 2016

(54) WORK MACHINE HAVING MAIN POLE

(75) Inventors: Yukihiko Yamada, Anjo (JP); Shinya Kojima, Anjo (JP); Akihiro Nomura, Anjo (JP)

(73) Assignee: MAKITA CORPORATION, Aichi (JP)

( * ) Notice: Subject to any disclaimer, the term of this patent is extended or adjusted under 35 U.S.C. 154(b) by 538 days.

(21) Appl. No.: 13/702,380

(22) PCT Filed: May 26, 2011

(86) PCT No.: PCT/JP2011/062098
§ 371 (c)(1),
(2), (4) Date: Dec. 6, 2012

(87) PCT Pub. No.: WO2011/155339
PCT Pub. Date: Dec. 15, 2011

(65) Prior Publication Data
US 2013/0075122 A1    Mar. 28, 2013

(30) Foreign Application Priority Data
Jun. 10, 2010   (JP) ................................ 2010-132694

(51) Int. Cl.
*A01D 34/412*   (2006.01)
*B25F 5/00*     (2006.01)
(Continued)

(52) U.S. Cl.
CPC . *B25F 5/00* (2013.01); *A01D 34/90* (2013.01); *F16C 1/00* (2013.01); *F16D 1/108* (2013.01); *F16D 1/112* (2013.01); *F16D 2001/102* (2013.01)

(58) Field of Classification Search
CPC .............. F16B 2/06; F16B 2/065; F16B 2/10; F16B 2/18; F16B 7/0406; F16B 7/0426; F16B 7/1418; A01D 34/412–34/42; A01D 34/46; A01D 34/49; A01D 34/52–34/62
USPC .............. 30/276, 296.1; 403/109.1, 305, 302, 403/301, 310, 312, 306
See application file for complete search history.

(56) References Cited

U.S. PATENT DOCUMENTS 2,842,387 A * 7/1958 Della-Porta ................... 403/324
4,185,936 A * 1/1980 Takahashi ..................... 403/104
(Continued)

FOREIGN PATENT DOCUMENTS

CA    2436762 A1 *  7/2002
CN    2448059        9/2001
(Continued)

OTHER PUBLICATIONS

International Search Report and English language translation thereof, mail date is Jul. 26, 2011.
(Continued)

*Primary Examiner* — Jason Daniel Prone
(74) *Attorney, Agent, or Firm* — Greenblum & Bernstein, P.L.C.

(57) ABSTRACT

A work machine includes a main pole internally including a rotation shaft, a tool unit located at one end of the main pole, and a power unit located at another end of the main pole. The main pole includes a first partial pole, a second partial pole and a joint member that joints them to each other. The first partial pole includes a positioning member. The joint member includes a positioning hole configured to engage with the positioning member and a guide groove extending from the positioning hole. The guide groove is configured to guide the positioning member to the positioning hole and to allow the positioning member to escape in at least a section thereof.

5 Claims, 13 Drawing Sheets

(51) Int. Cl.
  *A01D 34/90* (2006.01)
  *F16C 1/00* (2006.01)
  *F16D 1/108* (2006.01)
  *F16D 1/112* (2006.01)
  *F16D 1/10* (2006.01)

(56) References Cited

U.S. PATENT DOCUMENTS

| | | | |
|---|---|---|---|
| 4,397,088 A * | 8/1983 | Hampel | 30/296.1 |
| 4,463,498 A * | 8/1984 | Everts | 30/296.1 |
| 4,505,040 A * | 3/1985 | Everts | 30/296.1 |
| 4,575,356 A * | 3/1986 | Murohushi et al. | 464/52 |
| 4,733,471 A * | 3/1988 | Rahe | 30/276 |
| 4,744,690 A * | 5/1988 | Hsieh | 403/104 |
| 4,916,818 A * | 4/1990 | Panek | 30/296.1 |
| 4,944,711 A * | 7/1990 | Hironaka et al. | 30/296.1 |
| 4,991,298 A * | 2/1991 | Matre | 30/296.1 |
| 5,594,990 A * | 1/1997 | Brant et al. | 30/276 |
| 5,603,173 A * | 2/1997 | Brazell | 37/244 |
| 5,664,904 A * | 9/1997 | Hapgood et al. | 403/389 |
| 5,813,258 A * | 9/1998 | Cova et al. | 403/DIG. 8 |
| 6,006,434 A * | 12/1999 | Templeton et al. | 30/296.1 |
| 6,122,830 A * | 9/2000 | Jarzombek | 30/276 |
| 6,305,867 B1 | 10/2001 | Schweigert et al. | |
| 6,474,747 B2 * | 11/2002 | Beaulieu et al. | 30/296.1 |
| 6,488,511 B1 * | 12/2002 | Stewart | 30/296.1 |
| 6,904,687 B1 * | 6/2005 | Hill, Sr. | 30/296.1 |
| 6,908,249 B2 | 6/2005 | Tomm | 403/109.1 |
| 6,997,633 B2 | 2/2006 | Thomas et al. | 403/109.6 |
| 7,314,096 B2 * | 1/2008 | Shaffer et al. | 172/372 |
| 7,382,104 B2 * | 6/2008 | Jacobson et al. | 30/296.1 |
| 7,484,300 B2 * | 2/2009 | King et al. | 30/296.1 |
| 7,552,806 B2 * | 6/2009 | Tong | 30/296.1 |
| 7,739,800 B2 * | 6/2010 | Hurley et al. | 30/276 |
| 7,891,099 B2 * | 2/2011 | Wenckel | 30/276 |
| 7,980,519 B2 * | 7/2011 | Chen | 403/109.1 |
| 8,020,304 B2 * | 9/2011 | Mace et al. | 30/296.1 |
| 8,127,455 B2 * | 3/2012 | Wenckel et al. | 30/276 |
| 8,136,254 B2 * | 3/2012 | Gieske et al. | 30/296.1 |
| 8,506,198 B2 * | 8/2013 | West et al. | 403/13 |
| 8,528,217 B2 * | 9/2013 | Kondo et al. | 30/296.1 |
| 8,608,118 B2 * | 12/2013 | Lai | 403/374.2 |
| 8,641,314 B2 * | 2/2014 | Thacker et al. | 403/109.3 |
| 2002/0121262 A1* | 9/2002 | Kawamoto et al. | 30/276 |
| 2013/0142563 A1* | 6/2013 | Sumi et al. | 403/109.1 |
| 2014/0208598 A1* | 7/2014 | Morita et al. | 30/276 |
| 2014/0208599 A1* | 7/2014 | Nagahama | 30/276 |

FOREIGN PATENT DOCUMENTS

| | | |
|---|---|---|
| CN | 2547110 | 4/2003 |
| CN | 2829331 | 10/2006 |
| EP | 2599374 A1 * | 6/2013 |
| GB | 2 320 665 | 7/1998 |
| JP | 64-9528 | 1/1989 |
| JP | 10-127133 | 5/1998 |
| JP | 10-191748 | 7/1998 |
| JP | 2013116054 A * | 6/2013 |
| WO | 2007/085820 | 8/2007 |

OTHER PUBLICATIONS

Written Opinion of the International Searching Authority and English language translation thereof, mail date is Jul. 26, 2011.
China Office action, dated Oct. 10, 2014 along with an English translation thereof.
English translation of Written Opinion of the international searching authority for PCT/JP2011/062098.

* cited by examiner

WORK MACHINE HAVING MAIN POLE

TECHNICAL FIELD

The present invention relates to a work machine in which a tool unit is located at one end of a main pole, and a power unit is located at the other end of the main pole. As an example of this kind of work machine, a brush cutter, an edger, a pole hedge trimmer, a pole saw, and a cultivator are known.

BACKGROUND ART

Japanese Patent Application Publication No. H10-127133 discloses a brush cutter which is one kind of work machine. This brush cutter includes a main pole, a blade unit located at one end of the main pole, and a power unit located at the other end of the main pole. The main pole internally includes a rotation shaft. The tool unit holds a blade connected to the rotation shaft. The power unit includes a prime mover that drives the rotation shaft.

The main pole includes a first partial pole that extends from the tool unit, a second partial pole that extends from the power unit, and a joint member provided to the second partial pole. The first partial pole is detachably inserted into a through hole of the joint member. Due to this, when the user stores and carries the brush cutter, the user can shorten the long brush cutter by dividing the main pole into the first partial pole and the second partial pole.

When the user uses the work machine, the first partial pole and the second partial pole are connected again by the joint member. In this case, the first partial pole needs to be inserted into the through hole of the joint member to a predetermined position in a predetermined direction. Therefore, a positioning member is provided to the joint member, and a positioning hole is provided to the first partial pole. The positioning member is biased toward the first partial pole, and the positioning member engages with the positioning hole when the first partial pole is inserted into the joint member to the predetermined position in the predetermined direction. Thus, the user may need to insert the first partial pole into the joint member so that the positioning member engages with the positioning hole. As a result, the first partial pole is inserted into the joint member to the predetermined position in the predetermined direction.

SUMMARY OF INVENTION

Technical Problem

When the user inserts the first partial pole into the joint member, the user may have difficulties in engaging the positioning member with the positioning hole. In this case, the user may need to slide or rotate the first partial pole in relation to the joint member until the positioning member engages with the positioning hole. Here, the tool unit is provided to the first partial pole, and the power unit is provided to the joint member with the second partial pole interposed. It may be difficult to slide or rotate the first partial pole and the joint member relative to each other as these units are provided with heavy objects. Thus, the operation of connecting the first and second partial poles is a trouble for the user.

With the above problems in view, the present invention provides a work machine in which it is easy to connect a first partial pole and a second partial pole.

Solution to Technical Problem

A work machine according to the present invention includes a main pole, a tool unit located at one end of the main pole, and a power unit located at the other end of the main pole. The main pole internally includes a rotation shaft. The tool unit holds a tool connected to the rotation shaft. The power unit includes a prime mover that drives the rotation shaft. A portable work machine drives the tool of the tool unit via the rotation shaft with the aid of the prime mover of the power unit.

The main pole includes a first partial pole, a second partial pole, and a joint member provided to the second partial pole. The joint member includes a through hole to which the first partial pole is inserted from one side, and the first partial pole is configured to be removably inserted into the through hole of the joint member. Due to this, when the user stores and carries the work machine, the user can shorten the long work machine by dividing the main pole into the first partial pole and the second partial pole. Here, the first and second partial poles may be configured to be further divided into a plurality of partial poles. That is, the main pole may be configured to be divided into three or more partial poles.

When the user uses the work machine, the first partial pole and the second partial pole are connected again by the joint member. In this case, the first partial pole needs to be inserted into the through hole of the joint member to a predetermined position in a predetermined direction. Therefore, a positioning member that is biased toward the joint member is provided to the first partial pole. On the other hand, a positioning hole that engages with the positioning member is provided to the joint member. When the first partial pole is inserted into the joint member to the predetermined position in the predetermined direction, the positioning member engages with the positioning hole. With this configuration, the user may need to insert the first partial pole into the joint member so that the positioning member engages with the positioning hole. As a result, the first partial pole is inserted into the joint member to the predetermined position in the predetermined direction.

Further, a guide groove is provided to the joint member. The guide groove extends from the positioning hole toward one side (a side in which the first partial pole is inserted) of the through hole and guides the positioning member to the positioning hole. Thus, once the user engages the positioning member with the guide groove, the user can easily insert the first partial pole to a position at which the positioning member engages with the positioning hole.

When the user inserts the first partial pole into the joint member, within the joint member, the rotation shaft of the first partial pole is connected to the rotation shaft of the second partial pole. In general, the joint portions of both rotation shafts are formed in a non-circular cross-sectional shape in order to inhibit relative rotation. Thus, when the directions of both rotation shafts are misaligned, both rotation shafts collide with each other, and it is not possible to insert the first partial pole to the predetermined position. In such a case, since the brush cutter of the related art does not have the guide groove, it is possible to align the positions of both end portions of the rotation shafts and the directions thereof by rotating the first partial pole in relation to the joint member. In contrast, in a configuration where the guide groove is added, the positioning member may be restricted in a guide groove so that the rotation of the first partial pole in relation to the joint member is inhibited. In this case, the user needs to remove the first partial pole from the joint member, correct the directions of the rotation shafts, and insert the first partial pole into the joint member again. Here, such an operation may be repeated numerous times until the directions of both rotation shafts are aligned. This is because the relation between the first partial pole and the rotation angle of the rotation shaft accommodated therein is not constant but changes depending on the timing at which the rotation shaft stops rotating.

With the above problems taken into consideration, in the work machine according to the present invention, an escapable section is formed in at least a section of the guide groove. In the escapable section, the positioning member can escape from the guide groove. Thus, the user can rotate the first partial pole in relation to the joint member to align the directions of both rotation shafts without removing the first partial pole from the joint member. After the directions of both rotation shafts are aligned, and both rotation shafts start to be connected, the user can engage the positioning member with the guide groove again by rotating the first partial pole in a reverse direction. The rotation shaft can freely rotate in relation to the first partial pole, and the rotation shaft can freely rotate in relation to the second partial pole. When both rotation shafts are connected, it is possible to rotate the first partial pole while maintaining the connected state of both rotation shafts. After that, the user can easily insert the first partial pole to a position at which the positioning member engages with the positioning hole while being guided by the guide groove.

According to the above-described structure, it is possible to realize a work machine in which it is easy to connect the first partial pole and the second partial pole.

DETAILED DESCRIPTION OF INVENTION

Figure 1:
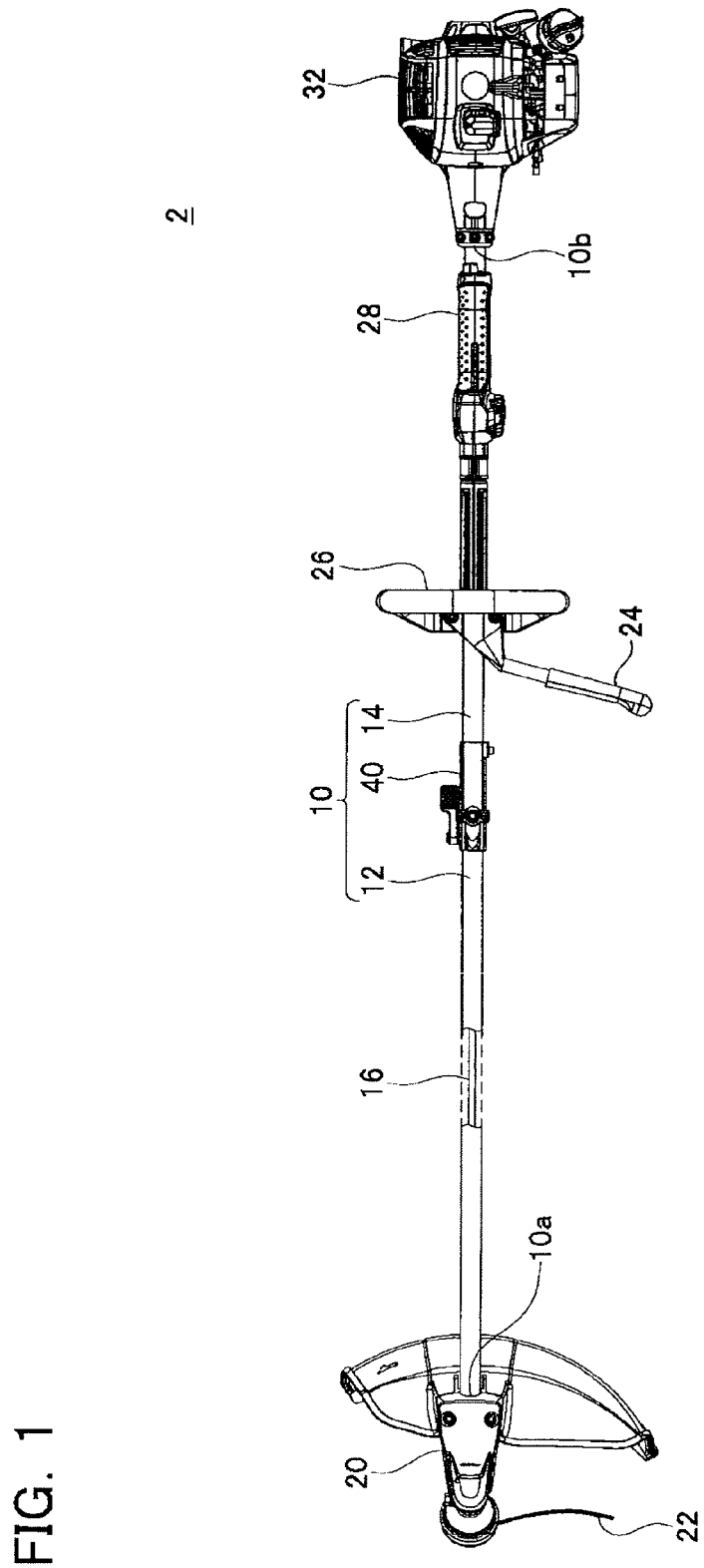
FIG. 1 is a plan view of a brush cutter according to an embodiment.

In one embodiment of the present invention, it is preferable that a guide groove has a cross-sectional shape that inhibits or allows a positioning member to escape from the guide groove. For example, when the guide groove is formed with a large depth, the escape of the positioning member is inhibited. When the guide groove is formed with a small depth, the escape of the positioning member is allowed. Alternatively, when a wall surface of the guide groove is vertical to a circumferential direction, the escape of the positioning member is inhibited. When the wall surface of the guide groove is a sloped surface that expands in the circumferential direction, the escape of the positioning member is allowed. Due to this, in one embodiment of the present invention, at least a section of the guide groove may have a cross-sectional shape that allows the positioning member to escape from the guide groove. In this case, the section forms the above-described escapable section. As an example, the escapable section may be formed with a small depth that allows the escape of the positioning member.

In one embodiment of the present invention, it is preferable that the guide groove extends to reach an opening of a through hole that is located at one side of the joint member. Moreover, it is preferable that the guide groove further includes a tapered section which is located between the escapable section and the opening, and in which the depth of the guide groove gradually increases toward the opening. According to this configuration, in the opening at one side of the through hole, it is possible to increase the depth of the guide groove, and it is possible to easily engage the positioning member with the guide groove when the first partial pole starts to be inserted into the through hole of the joint member.

In one embodiment of the present invention, it is preferable that the positioning member is located within the escapable section of the guide groove when the first partial pole is inserted into the through hole of the joint member, and the rotation shaft of the first partial pole starts to be connected to the rotation shaft of the second partial pole. With such a configuration, when the directions of both rotation shafts are misaligned so that it is not possible to connect both rotation shafts, the user can rotate the first partial pole in relation to the joint member to align the directions of both rotation shafts without pulling back the first partial pole.

In one embodiment of the present invention, the positioning member may be provided to the joint member rather than the first partial pole, and the positioning hole and the guide groove may be provided to the first partial pole rather than the joint member. Alternatively, the positioning member may be provided to the first partial pole and the joint member, and the positioning hole and the guide groove corresponding to the respective positioning members may be provided to the joint member and the first partial pole, respectively.

Embodiment

Figure 2:
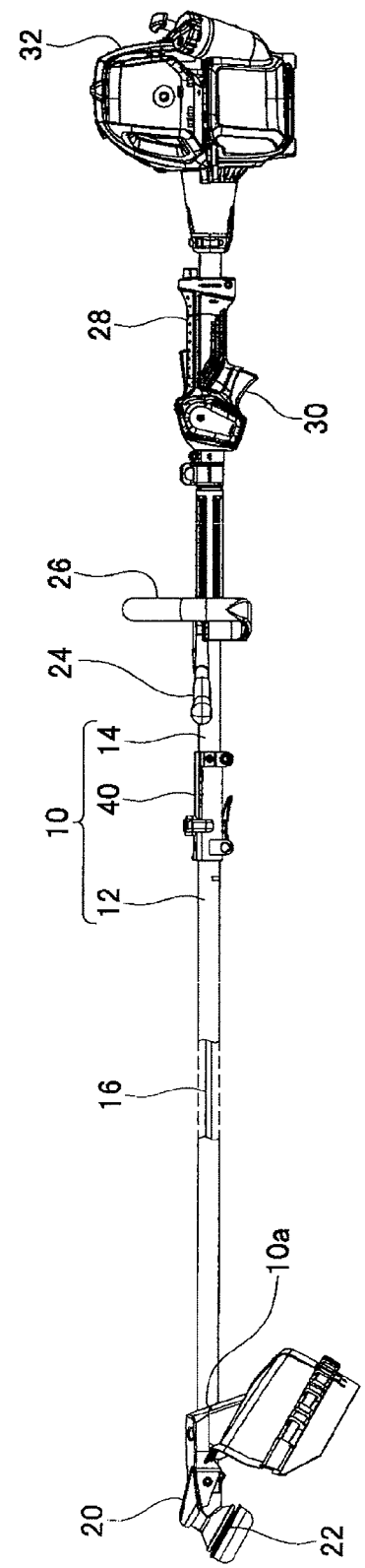
FIG. 2 is a side view of the brush cutter according to the embodiment.

A brush cutter 2 which is one embodiment of the present invention will be described with reference to the drawings. FIG. 1 illustrates a plan view of the brush cutter 2, and FIG. 2 illustrates a side view of the brush cutter 2. The brush cutter 2 is used in a work for cutting a clump of plants and grass. The brush cutter 2 is a portable work machine that is held by a user when it is used.

As illustrated in FIGS. 1 and 2, the brush cutter 2 includes a main pole 10, a tool unit 20 located at a front end 10a of the main pole 10, and a power unit 32 located at a rear end 10b of the main pole 10. The main pole 10 is formed using a pipe material and internally includes a rotation shaft 16. The rotation shaft 16 extends within the main pole 10 from the tool unit 20 to the power unit 32. The main pole 10 includes a lever handle 24, a loop handle 26, and a pole grip 28 which are grasped by the user. The pole grip 28 includes a throttle lever 30.

The tool unit 20 holds a cord cutter 22. The cord cutter 22 is connected to the rotation shaft 16. The cord cutter 22 is a tool of the brush cutter 2 that cuts plants and grass. A disc blade may be attached to the tool unit 20 instead of the cord cutter 22. An engine (not illustrated) that drives the rotation shaft 16 is included in the power unit 32. The brush cutter 2 rotates the cord cutter 22 of the tool unit 20 via the rotation shaft 16 with a power from the engine of the power unit 32. The rotation speed of the engine is adjusted by the throttle lever 30.

The main pole 10 includes a first partial pole 12, a second partial pole 14, and a joint member 40 provided at an end of the second partial pole 14. The joint member 40 connects the first partial pole 12 and the second partial pole 14. The first partial pole 12 extends from the tool unit 20 to the joint member 40, and the second partial pole 14 extends from the power unit 32 to the joint member 40. The first partial pole 12 and the second partial pole 14 are connected to the same shaft by the joint member 40. Both the first and second partial poles 12 and 14 have a circular cross-sectional shape. Although the joint member 40 according to the present embodiment is configured as a member independent from the second partial pole 14, a portion or an entirety of the joint member 40 may be formed to be integrated with an end portion of the second partial pole 14.

Figure 3:
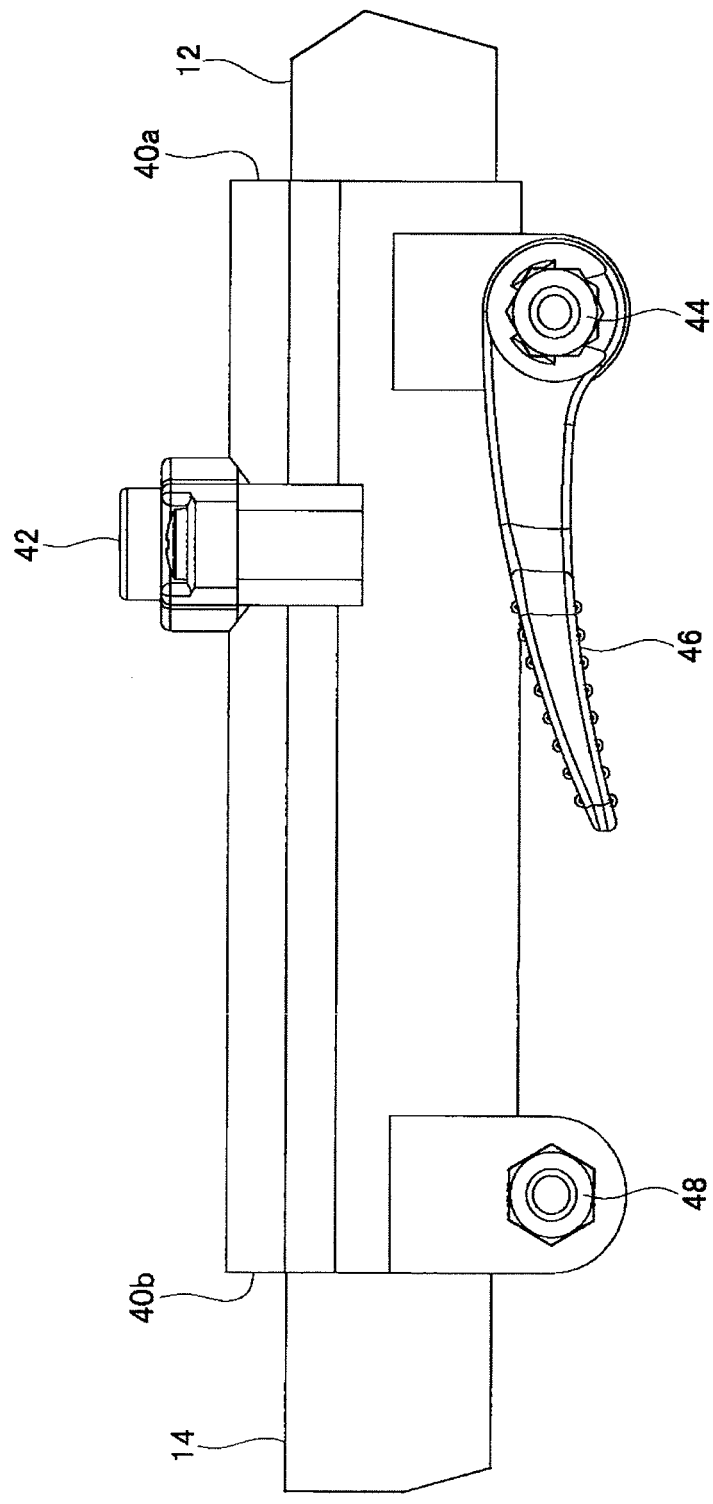
FIG. 3 is an external view of joint portions between a first partial pole and a second partial pole connected by a joint member.
Figure 4:
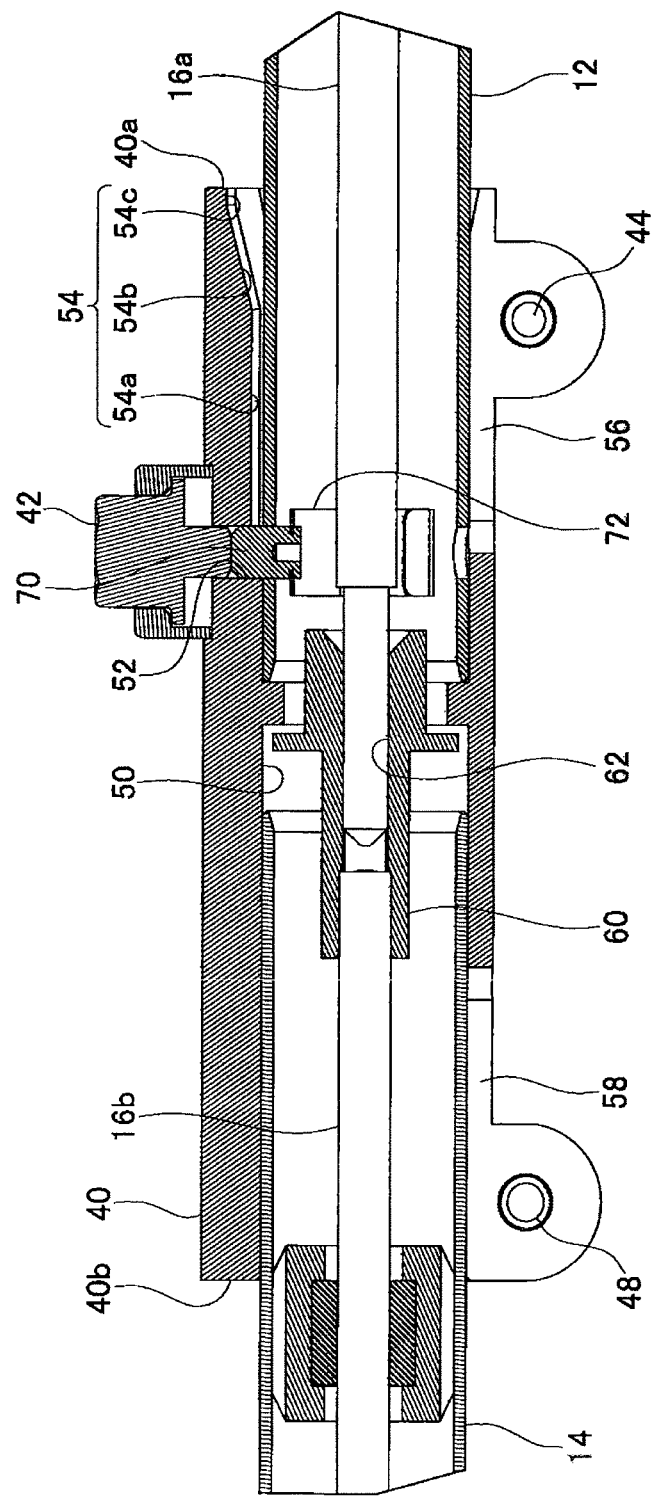
FIG. 4 is a cross-sectional view of the joint portions between the first partial pole and the second partial pole connected by the joint member.

FIG. 3 illustrates joint portions between the first partial pole 12 and the second partial pole 14 connected by the joint member 40. FIG. 4 illustrates a cross-sectional structure of the joint portions illustrated in FIG. 3. As illustrated in FIGS. 3 and 4, the joint member 40 is a cylindrical member and includes a through hole 50 having a circular cross-sectional shape. The through hole 50 extends from a front end 40a of the joint member 40 to a rear end 40b of the joint member 40. The first partial pole 12 is inserted into the through hole 50 of the joint member 40 from the side of the front end 40a, and the second partial pole 14 is inserted from the side of the rear end 40b. Within the through hole 50 of the joint member 40, a rotation shaft 16a of the first partial pole 12 and a rotation shaft 16b of the second partial pole 14 are connected with a joint socket 60 interposed.

Figure 5:
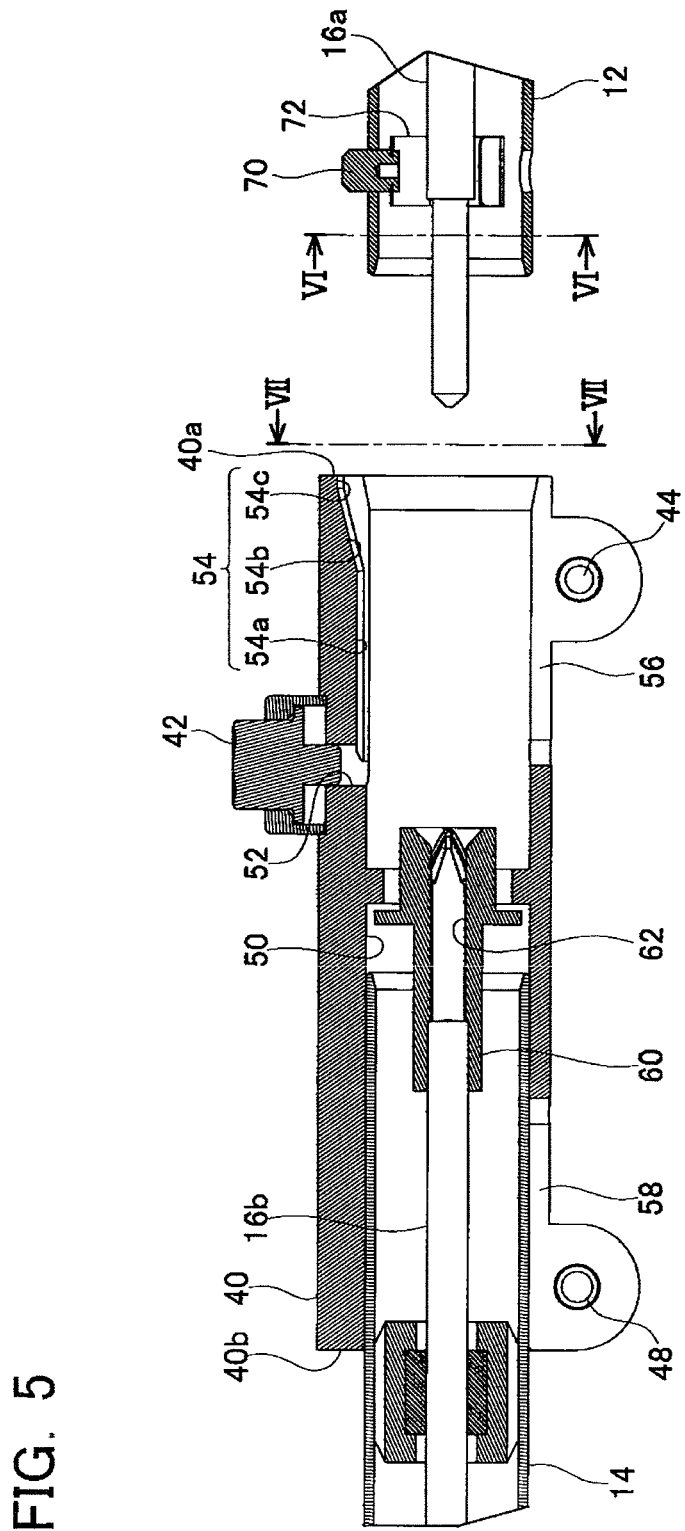
FIG. 5 is a cross-sectional view illustrating a state where the first partial pole is removed from the joint member.

The joint member 40 includes a bolt 44 for fixing the first partial pole 12 and a bolt 48 for fixing the second partial pole 14. Moreover, a slit 56 that extends from the front end 40a and a slit 58 that extends from the rear end 40b are formed in the joint member 40. The bolt 44 is provided to extend over the slit 56, and the bolt 48 is provided to extend over the slit 58. As illustrated in FIG. 3, an operating lever 46 is provided to the bolt 44 for the first partial pole 12 so that the bolt 44 can be easily loosened without using a tool called a spanner. When the bolt 44 is loosened, the first partial pole 12 can be removed from the joint member 40 as illustrated in FIG. 5. Thus, when the user stores and carries the brush cutter 2, the user can shorten the long brush cutter 2 by dividing the main pole 10 into the first and second partial poles 12 and 14.

Figure 6:
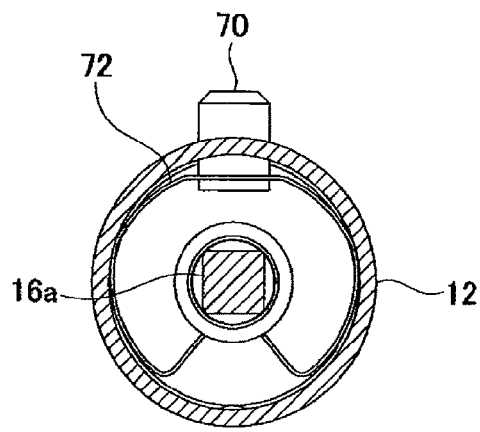
FIG. 6 is a cross-sectional view along line VI-VI in FIG. 5.
Figure 7:
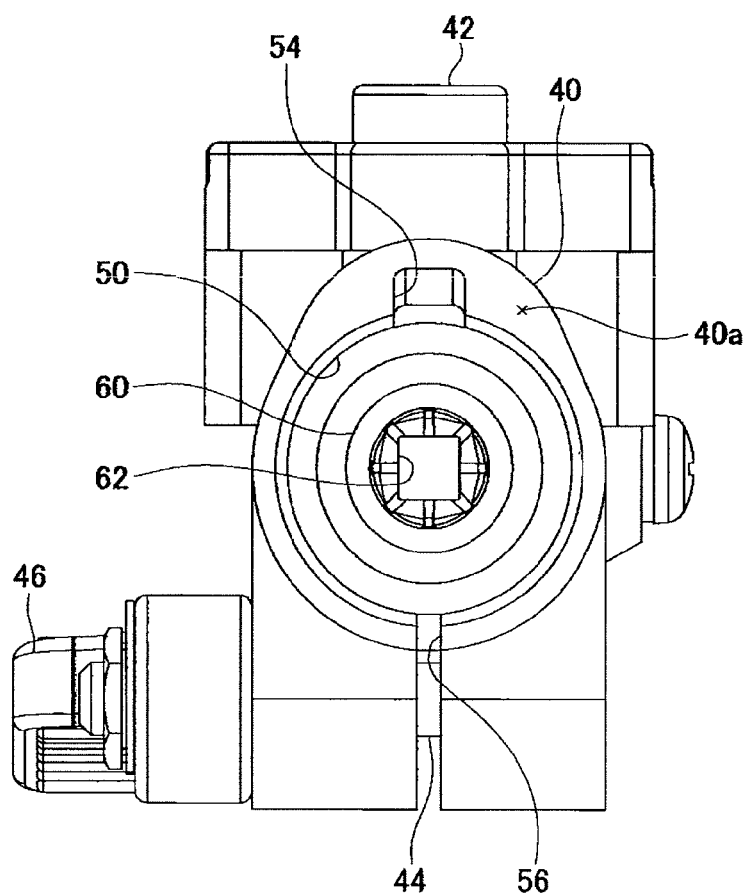
FIG. 7 is a cross-sectional view along line VII-VII in FIG. 5.

As illustrated in FIGS. 4 and 5, the joint socket 60 is fixed to the rotation shaft 16b of the second partial pole 14. Moreover, the joint socket 60 includes an insertion hole 62 in which the rotation shaft 16a of the first partial pole 12 is inserted. As illustrated in FIGS. 6 and 7, an end portion of the rotation shaft 16a of the first partial pole 12 and the insertion hole 62 of the joint socket 60 have a square cross-sectional shape. In this way, since the joint portions between the two rotation shafts 16a and 16b are formed in a non-circular cross-sectional shape, the two rotation shafts 16a and 16b are connected so as not to be rotated relative to each other. The structure of the joint portions between the two rotation shafts 16a and 16b is not limited to the structure illustrated in the present embodiment. Various structures in which the two rotation shafts 16a and 16b are connected so as not to be rotated relative to each other when they move close to each other, and the connection is released when they move away from each other can be appropriately employed to both end portions of the two rotation shafts 16a and 16b.

When the first partial pole 12 and the second partial pole 14 are connected, the first partial pole 12 needs to be inserted into the through hole 50 of the joint member 40 to a predetermined position (predetermined depth) in a predetermined direction. Therefore, as illustrated in FIGS. 4, 5, 6, and 7, a positioning member 70 is provided to the first partial pole 12, and a positioning hole 52 that engages with the positioning member 70 is provided to the joint member 40. The positioning member 70 is located on an outer circumferential surface of the first partial pole 12 and protrudes from the outer circumferential surface. The positioning member 70 is supported by a leaf spring 72 and is biased toward the outer side in the radial direction of the first partial pole 12. On the other hand, the positioning hole 52 is formed on a wall surface of the through hole 50 of the joint member 40.

When the first partial pole 12 is inserted into the through hole 50 of the joint member 40 to the predetermined position in the predetermined direction, the positioning member 70 of the first partial pole 12 engages with the positioning hole 52 of the joint member 40 by a biasing force of the leaf spring 72. With this configuration, when connecting the first partial pole 12 and the second partial pole 14, the user may need to insert the first partial pole 12 into the through hole 50 of the joint member 40 so that the positioning member 70 engages with the positioning hole 52. As a result, the first partial pole 12 is inserted into the through hole 50 of the joint member 40 to the predetermined position in the predetermined direction. The engagement between the positioning member 70 and the positioning hole 52 can be easily released by a release button 42 provided to the joint member 40.

As illustrated in FIGS. 4, 5, and 7, a guide groove 54 is further provided to the joint member 40. The guide groove 54 is formed on an inner surface of the through hole 50 of the joint member 40. The guide groove 54 extends along an axial direction of the through hole 50 from the positioning hole 52 to an opening of the through hole 50 located at the front end 40a of the joint member 40. The guide groove 54 is configured to allow the positioning member 70 to engage with the guide groove 54 and to guide the positioning member 70 up to the positioning hole 52. Thus, once the user engages the positioning member 70 with the guide groove 54, the user can easily insert the first partial pole 12 to a position at which the positioning member 70 engages with the positioning hole 52.

Figure 8:
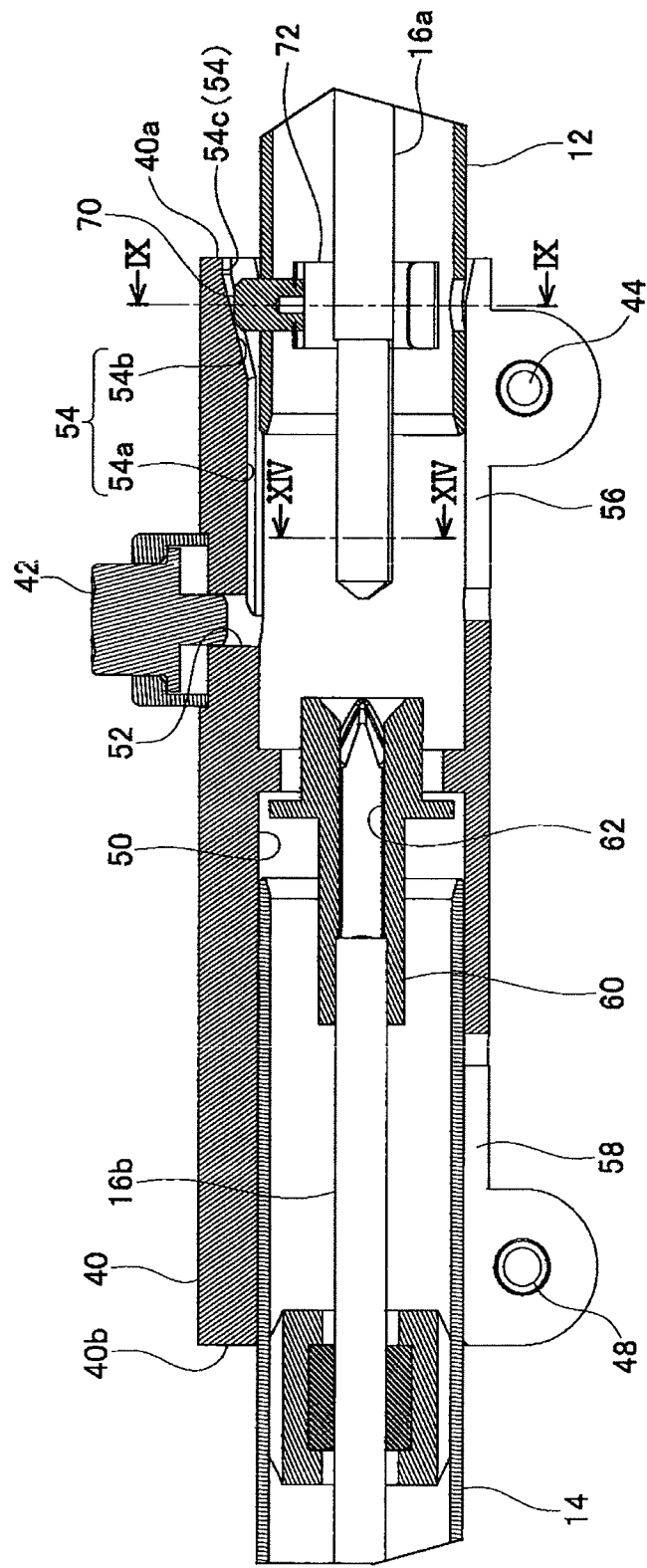
FIG. 8 is a view illustrating a state where the first partial pole is inserted into the joint member with the directions of two rotation shafts misaligned from each other.
Figure 9:
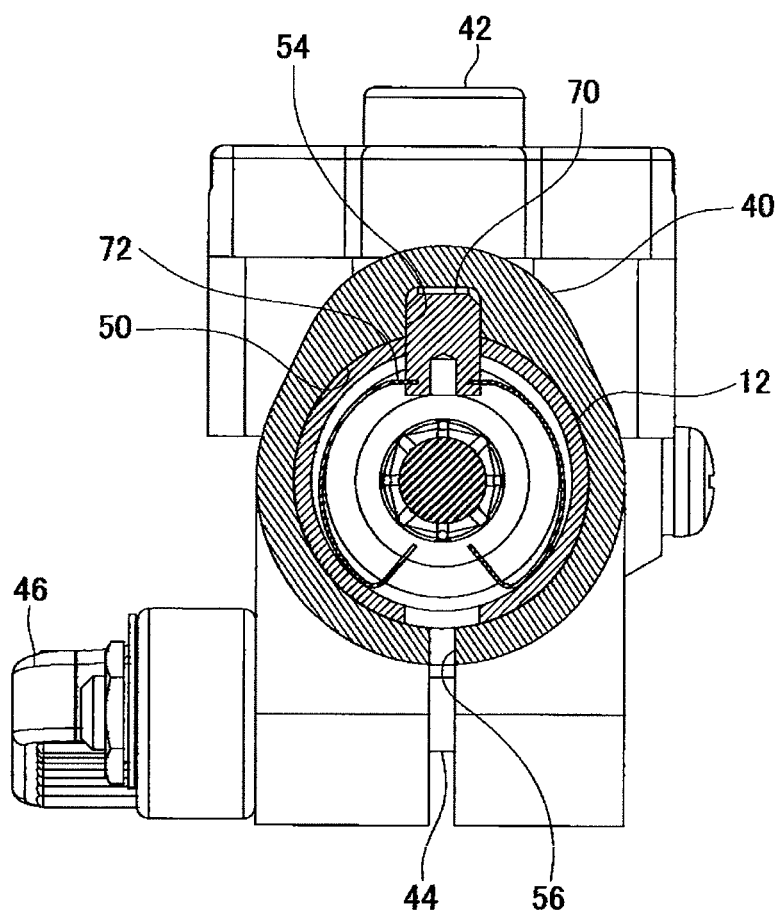
FIG. 9 is a cross-sectional view along line IX-IX in FIG. 8.
Figure 10:
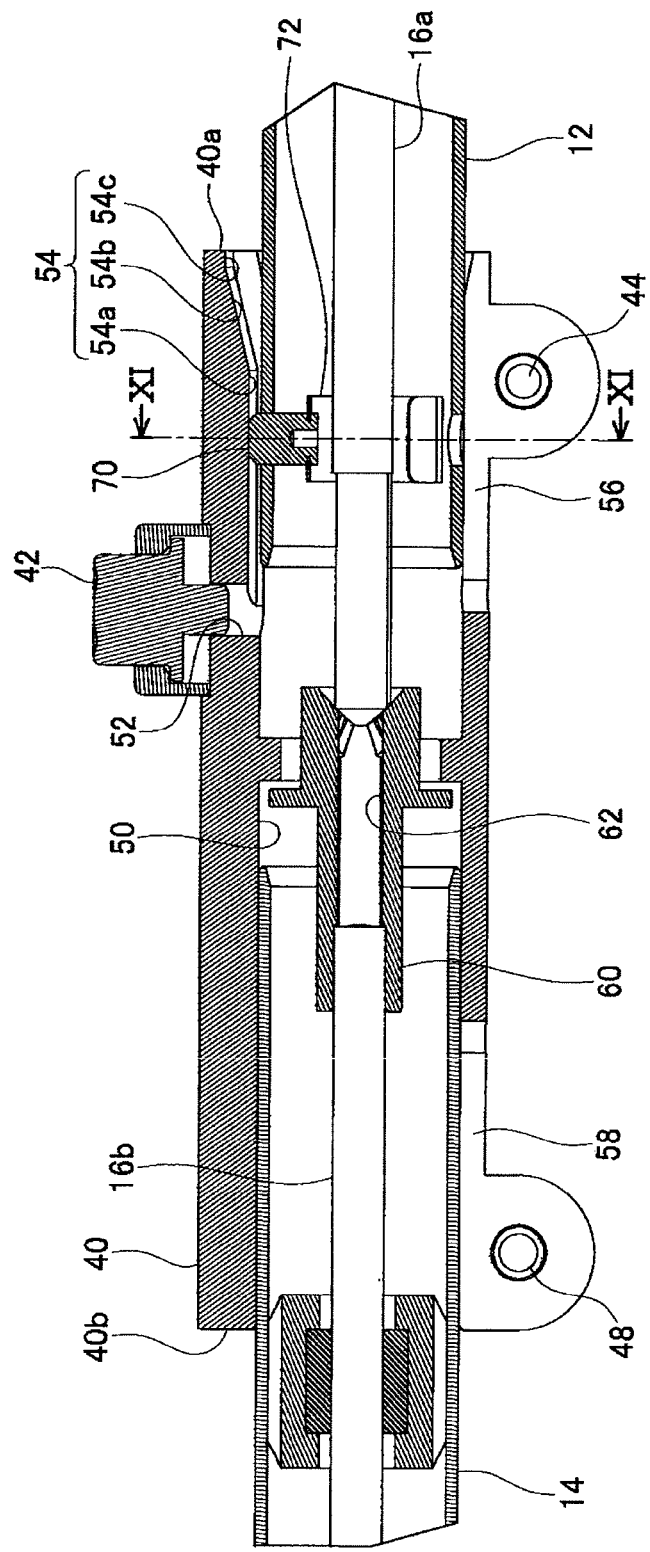
FIG. 10 is a view illustrating a state where two rotation shafts collide with each other when the first partial pole is inserted into the joint member.
Figure 11:
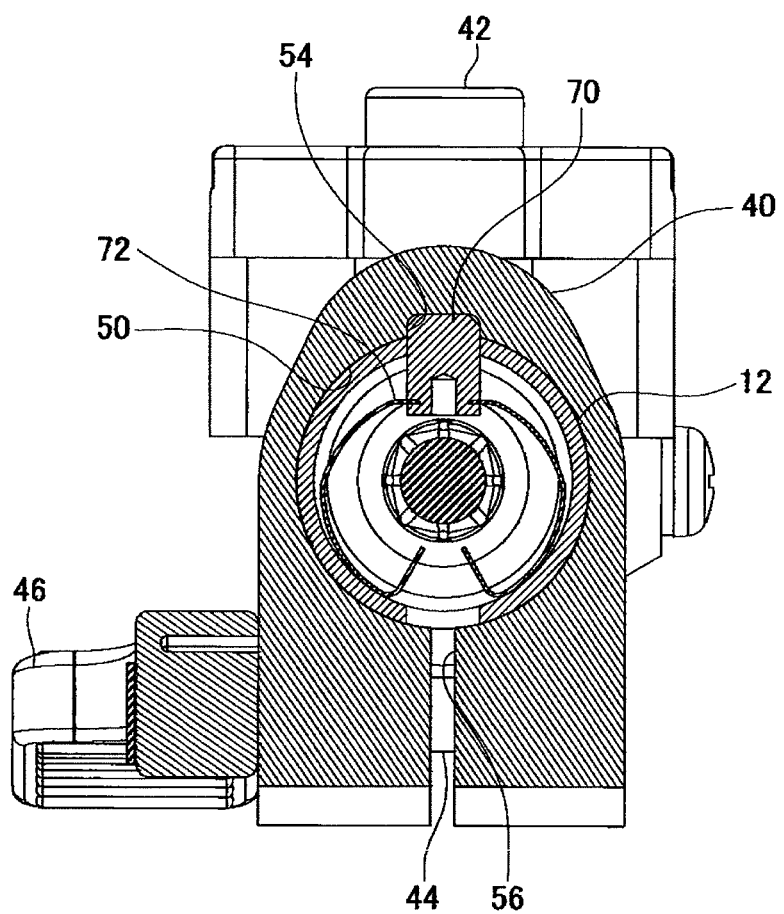
FIG. 11 is a cross-sectional view along line XI-XI in FIG. 10.
Figure 14:
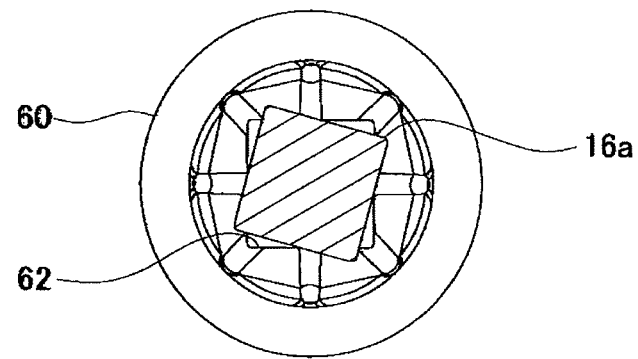
FIG. 14 is a cross-sectional view along line XIV-XIV in FIG. 8.

When the user inserts the first partial pole 12 into the joint member 40, within the joint member 40, the rotation shaft 16a of the first partial pole 12 is connected to the rotation shaft 16b of the second partial pole 14 with the joint socket 60 interposed. As described above, the joint portions of the two rotation shafts 16a and 16b are formed in a non-circular cross-sectional shape (in the present embodiment, a square-shape) in order to inhibit relative rotation. Thus, as illustrated in FIGS. 8, 9, and 14, it is assumed that the directions of the two rotation shafts 16a and 16b are misaligned. In this case, as illustrated in FIGS. 10 and 11, the two rotation shafts 16a and 16b collide with each other with the joint socket 60 interposed. As a result, the user cannot insert the first partial pole 12 to the predetermined position (a position at which the positioning member 70 engages with the positioning hole 52).

In the above state, it is assumed that the guide groove 54 strongly restricts the positioning member 70. That is, it is assumed that the positioning member 70 is inhibited from escaping from the guide groove 54. In this case, the user cannot rotate the first partial pole 12 in relation to the joint member 40. Thus, the user needs to remove the first partial pole 12 from the joint member 40, correct the directions of the rotation shafts 16a and 16b, and insert the first partial pole 12 again into the joint member 40. Here, such an operation may be repeated numerous times until the directions of the two rotation shafts 16a and 16b are aligned.

Figure 12:
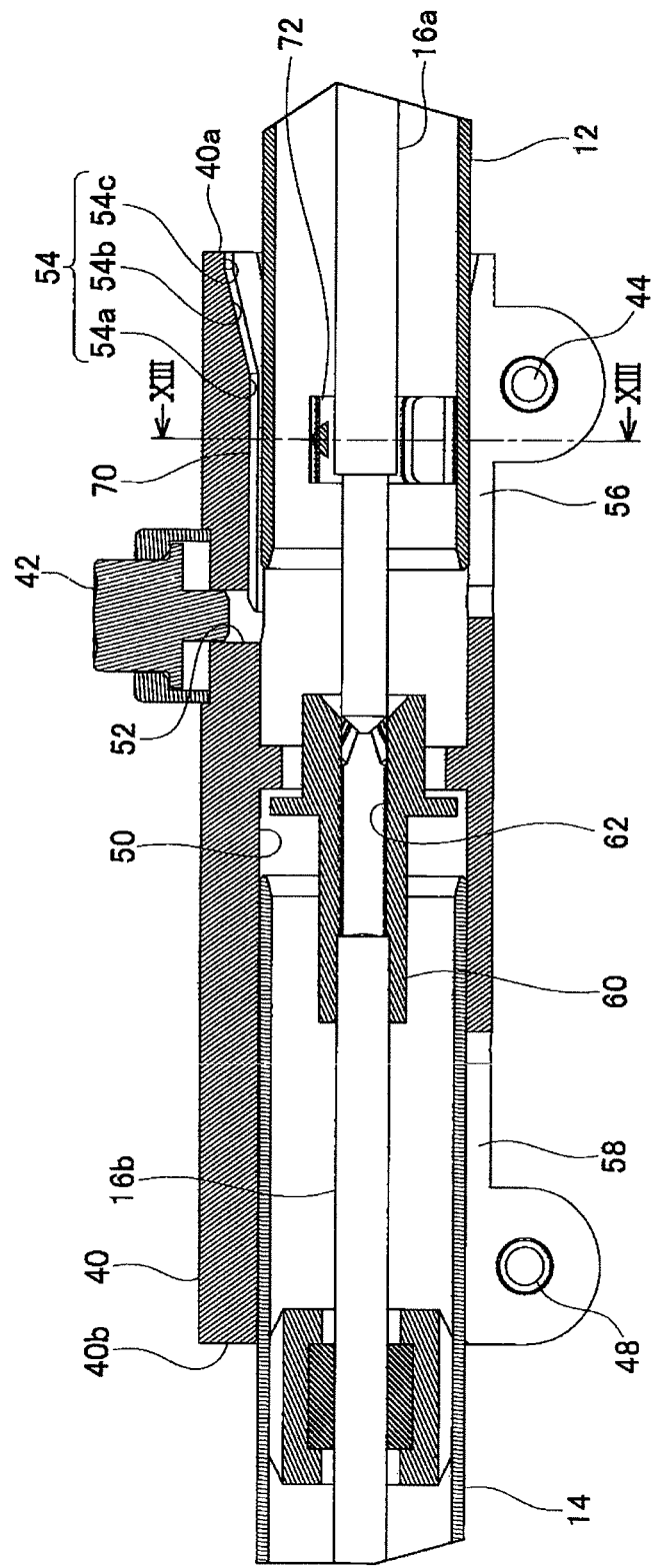
FIG. 12 is a view illustrating a state where the first partial pole is rotated in relation to the joint member so that the directions of the two rotation shafts are aligned.
Figure 13:
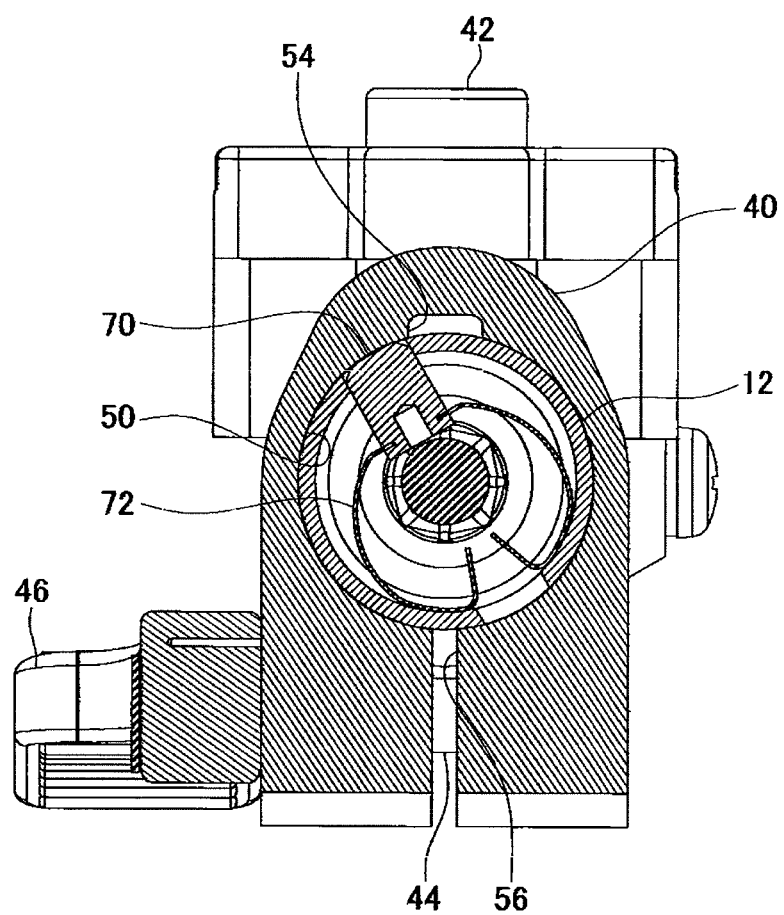
FIG. 13 is a cross-sectional view along line XIII-XIII in FIG. 12.

With the above problem taken into consideration, in the brush cutter 2 according to the present embodiment, an escapable section 54a is provided in at least a section of the guide groove 54. In the escapable section 54a, the guide groove 54 is formed with a small depth. With this structure, when the user applies force so that the first partial pole 12 is turned in relation to the joint member 40, the positioning member 70 can escape from the guide groove 54 in the circumferential direction. Thus, as illustrated in FIGS. 12 and 13, the user can rotate the first partial pole 12 in relation to the joint member 40 to align the directions of the two rotation shafts 16a and 16b without removing the first partial pole 12 from the joint member 40. After the directions of the two rotation shafts 16a and 16b are aligned, and the two rotation shafts 16a and 16b start to be connected, the user can engage the positioning member 70 with the guide groove 54 again by rotating the first partial pole 12 in a reverse direction. After that, the user can easily insert the first partial pole 12 to a predetermined position at which the positioning member 70 engages with the positioning hole 52 while being guided by the guide groove 54.

In the present embodiment, the guide groove 54 includes a tapered section 54b and an introduction end 54c in addition to the escapable section 54a. As described above, the escapable section 54a is continuous to the positioning hole 52 and is formed with a relatively small depth. Due to this, in the escapable section 54a, the positioning member 70 is allowed to escape in the circumferential direction. On the other hand, the introduction end 54c is located at an opening of the through hole 50 located at the front end 40a of the joint member 40 and is formed with a depth larger than that of the escapable section 54a. When inserting the first partial pole 12 into the through hole 50 of the joint member 40, the user needs to first engage the positioning member 70 with the introduction end 54c of the guide groove 54. In this case, since the introduction end 54c of the guide groove 54 is formed with a relatively large depth, the user can easily engage the positioning member 70 with the guide groove 54. The tapered section 54b is located between the escapable section 54a and the introduction end 54c and the depth thereof gradually increases toward the introduction end 54c. Due to this, the positioning member 70 can move smoothly by being pushed along the guide groove 54 from the introduction end 54c to the escapable section 54a.

In the present embodiment, as illustrated in FIGS. 10 and 11, the positioning member 70 is located within the escapable section 54a of the guide groove 54 when the first partial pole 12 is inserted into the through hole 50 of the joint member 40, and the rotation shaft 16a of the first partial pole 12 starts to be connected to the rotation shaft 16 of the second partial pole 14. With such a configuration, when the directions of the two rotation shafts 16a and 16b are misaligned so that it is not possible to connect the two rotation shafts 16a and 16b, the user can rotate the first partial pole 12 in relation to the joint member 40 without pulling back the first partial pole 12.

Specific embodiment of the present invention is described above, but that merely illustrates some possibilities of the teachings and does not restrict the claims thereof. The art set forth in the claims includes variations and modifications of the specific examples set forth above.

For example, the escapable section 54a of the guide groove 54 may be provided in entire sections of the guide groove 54 as well as a section of the guide groove 54. Moreover, the escapable section 54a of the guide groove 54 may be formed by configuring the wall surface of the guide groove 54 as a gentle sloped surface as well as making the guide groove 54 shallow. The cross-sectional shape of the escapable section 54a of the guide groove 54 may be appropriately changed taking the cross-sectional shape of the positioning member 70 into consideration.

The positioning member 70 may be provided to the joint member 40 rather than the first partial pole 12. In this case, the positioning hole 52 and the guide groove 54 may be provided to the first partial pole 12 rather than the joint member 40. Alternatively, the positioning member 70 may be provided to the first partial pole 12 and the joint member 40, and the positioning hole 52 and the guide groove 54 corresponding to the respective positioning members 70 may be provided to the joint member 40 and the first partial pole 12, respectively.

In the present embodiment, although the first partial pole 12 that can be detached from the joint member 40 is located on the side of the tool unit 20 in relation to the joint member 40, the first partial pole 12 may be located on the side of the power unit 32 in relation to the joint member 40. Alternatively, the second partial pole 14 as well as the first partial pole 12 may be configured to be detached from the joint member 40.

In this specification, although the brush cutter 2 has been described as one embodiment of the present invention, the structure related to the main pole 10 described in this specification can be similarly applied to other types of work machine having the main pole 10.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. A work machine, comprising:
   a proximal end;
   a distal end;
   a main pole internally comprising a separable rotation shaft, the main pole extending in a longitudinal direction between the proximal end and the distal end, and the main pole comprising a first partial pole, a second partial pole and a joint member,
   the joint member having a through hole configured to accept insertion of the first partial pole from a first side of the through hole, wherein the first partial pole is configured to be removably inserted into the first side of the through hole, and the joint member being attached to the second partial pole at a second side of the through hole,
   the first partial pole having a positioning member configured to be biased by a biasing member toward the joint member,
   the joint member having a positioning hole configured to engage with the positioning member and a guide groove extending from the positioning hole toward the first side of the through hole and configured to guide the positioning member to the positioning hole,
   the guide groove penetrating an inner surface of the joint member,
   the guide groove comprising a first tapered section and a second tapered section adjacent to each other in the longitudinal direction, wherein the first tapered section has a different inclination than the second tapered section, and wherein a depth of the guide groove, as defined by the tapered sections, increases in a direction from the positioning hole toward the first side of the through hole, a tool unit located the distal end, the tool unit configured to hold a tool connected to the rotation shaft; and a power unit located at the proximal end, the power unit comprising a prime mover configured to drive the rotation shaft.

2. The work machine as in claim 1, wherein the first tapered section of the guide groove has a cross-sectional shape that allows the positioning member to disengage from the guide groove.

3. The work machine as in claim 2, wherein the first tapered section of the guide groove is formed with a depth, defined at an outer periphery of the cross-sectional shape, to allow the positioning member to disengage from the guide groove.

4. The work machine as in claim 1, wherein the positioning member is located within the first tapered section of the guide groove when a first portion of the separable rotation shaft that is provided within the first partial pole engages a second portion of the separable rotation shaft that is provided within the second partial pole as the first partial pole is inserted into the through hole of the joint member.

5. A joint member for jointing a first partial pole and a second partial pole, comprising:

a through hole configured to accept insertion of the first partial pole from a first side of the through hole;

a positioning hole configured to engage with a positioning member provided to the first partial pole; and a guide groove extending from the positioning hole toward the first side of the through hole and configured to guide the positioning member to the positioning hole, the guide groove penetrating an inner surface of the joint member, the guide groove comprising a first tapered section and a second tapered section adjacent to each other in the longitudinal direction, wherein the first tapered section has a different inclination than the second tapered section, and wherein a depth of the guide groove, as defined by the tapered sections, increases in a direction from the positioning hole toward the first side of the through hole.

* * * * *